United States Patent
Ioffe

(10) Patent No.: US 7,351,905 B2
(45) Date of Patent: Apr. 1, 2008

(54) APPARATUS FOR POWERING AN ELECTRONIC MUSICAL INSTRUMENT

(76) Inventor: Simona Ioffe, 52 Aberdeen St., Newton, MA (US) 02461

( * ) Notice: Subject to any disclaimer, the term of this patent is extended or adjusted under 35 U.S.C. 154(b) by 582 days.

(21) Appl. No.: 11/095,324

(22) Filed: Mar. 31, 2005

(65) Prior Publication Data
US 2005/0218880 A1 Oct. 6, 2005

Related U.S. Application Data

(60) Provisional application No. 60/558,624, filed on Apr. 1, 2004, provisional application No. 60/558,623, filed on Apr. 1, 2004.

(51) Int. Cl.
*G10H 5/00* (2006.01)

(52) U.S. Cl. .............. 84/723; 84/741; 84/743; 333/32

(58) Field of Classification Search .......... 323/371; 84/723, 741, 743, 454; 439/125; 381/123; 200/51.05
See application file for complete search history.

(56) References Cited

U.S. PATENT DOCUMENTS

| | | | | |
|---|---|---|---|---|
| 3,662,223 A * | 5/1972 | Marshall | ............ | 361/820 |
| 4,944,016 A | 7/1990 | Christian | | |
| 5,010,802 A * | 4/1991 | Lanham | ............ | 84/743 |
| 5,018,204 A | 5/1991 | Christian | | |
| 5,025,704 A * | 6/1991 | Davis | ............ | 84/723 |
| 5,522,738 A * | 6/1996 | Lace | ............ | 439/669 |
| 5,585,767 A * | 12/1996 | Wright, Jr. | ............ | 333/32 |
| 5,677,959 A * | 10/1997 | Silfvast | ............ | 381/77 |
| 6,143,995 A * | 11/2000 | Ward | ............ | 200/51.05 |
| 6,653,543 B2 * | 11/2003 | Kulas | ............ | 84/454 |
| 6,928,175 B1 * | 8/2005 | Bader et al. | ............ | 381/123 |
| 7,060,889 B2 * | 6/2006 | Bellak | ............ | 84/741 |
| 2002/0020280 A1 * | 2/2002 | Kondo | ............ | 84/647 |
| 2003/0040205 A1 * | 2/2003 | Scheider et al. | ............ | 439/125 |
| 2006/0000346 A1 * | 1/2006 | Bellak | ............ | 84/741 |

* cited by examiner

*Primary Examiner*—Paul Ip
(74) *Attorney, Agent, or Firm*—Pandiscio & Pandiscio; Scott R. Foster

(57) ABSTRACT

Apparatus for providing electrical power to signal conditioner circuitry inside a musical instrument having a signal output jack mounted thereon to carry a conditioned music signal via a signal cable to a remote location. The power source is a battery mounted inside a housing that is part of a signal plug on the signal cable plugged into the signal output jack. The battery powers the signal conditioner circuitry while the signal plug is in the jack. The housing provides access to the battery. Alternatively, a rechargeable power source is mounted inside or otherwise on the instrument and is connected to the jack. A power supply first plug is inserted into the signal output jack to charge the rechargeable power source. After charging the power source, the first plug is unplugged and a second plug of a signal cable is plugged into the jack to carry the conditioned signal to the remote location. When the second plug is plugged into the jack, the charged rechargeable power source provides power to the signal conditioner circuitry.

20 Claims, 5 Drawing Sheets

APPARATUS FOR POWERING AN ELECTRONIC MUSICAL INSTRUMENT

CROSS REFERENCE TO RELATED APPLICATIONS

This application claims the benefit of U.S. Provisional Patent Application Ser. No. 60/558,624, filed Apr. 1, 2004 by Simona Ioffe for SYSTEM FOR POWERING A SIGNAL CONDITIONER CIRCUIT DISPOSED INSIDE A CONCEALED VOLUME, and U.S. Provisional Patent Application Ser. No. 60/558,623, filed Apr. 1, 2004 by Simona Ioffe for SYSTEM FOR POWERING A SIGNAL CONDITIONER CIRCUIT DISPOSED INSIDE A CONCEALED VOLUME.

BACKGROUND OF THE INVENTION

1. Field of the Invention

This invention relates in general to means for supplying power to signal conditioner circuitry inside musical instruments.

2. Description of the Prior Art

In the prior art, signal conditioner circuitry is often located inside musical instruments, such as stringed instruments. Such circuitry typically includes, but is not limited to, preamplifiers, buffers, equalizers and compressors. These circuits must have electrical power supplied thereto and energy sources, such as batteries, are mounted inside the musical instruments.

A big disadvantage to locating batteries inside stringed instruments is that when it is time to remove and/or replace the batteries they are too often in a hard to reach place in the instruments. In addition, musicians generally remove batteries from their instrument(s) before transportation and they also usually replace the batteries before every performance. For too many stringed instruments the strings have to be loosened or removed to remove and/or replace the batteries.

Thus, it is highly desirable to simplify the procedure of providing power to signal conditioner circuitry located inside musical instruments.

In addition, there is a need in the art to provide electrical power to signal conditioner circuitry located inside musical instruments from outside the instruments so there is seldom any need to ever get inside the instruments to replace and/or remove batteries.

Further, there is a need for providing electrical power to signal conditioner circuitry inside musical instruments without having to add more connectors or jacks on the instruments, and without having to add more wires connecting to the instruments via such additional connectors or jacks.

SUMMARY OF THE INVENTION

The foregoing needs in the prior art are met by the present invention. Electrical power is externally provided to signal conditioner circuitry mounted inside musical instruments so the need to access the interior of such musical instruments to change or remove batteries is eliminated. Such external electrical power is provided to the signal conditioner circuitry mounted inside a musical instrument by using a conditioned signal output connector or jack mounted through the wall of the instrument, so no additional connectors or jacks are required.

This is accomplished in two ways. In a first embodiment of the invention an electrical energy storage device is mounted on the musical instrument with the signal conditioner circuitry. Preferably, such energy storage device comprises a capacitor or a rechargeable battery that is electrically connected to the signal output connector or jack of the musical instrument. The energy storage device is charged by connecting a direct current (DC) power source that is external to the musical instrument to the connector or jack using a mating plug. When the energy storage device is charged the DC power source is unplugged from the connector or jack and one end of a signal cable is plugged into the jack. The other end of the signal cable is plugged into a remotely located amplifier, soundboard or other audio equipment in a manner known in the art. The signal from the musical instrument that has been processed by the signal conditioner circuitry is utilized by the amplifier, soundboard or other audio equipment in a manner known in the art.

In a second embodiment of the invention, there is no electrical energy storage device mounted on the musical instrument along with the signal conditioner circuitry. Electrical power for the signal conditioner circuitry is input thereto from external to the musical instrument. A novel signal cable is plugged into the connector or jack of the musical instrument. This novel signal cable permits power from a DC power source external to the musical instrument to be input to the instrument via the connector or jack to provide electrical power to the signal conditioner circuitry. At the same time, the signal from the musical instrument that has been processed by the signal conditioner circuitry is output via the connector or jack and the same novel signal cable plugged therein, to be utilized by an amplifier, soundboard or other audio equipment.

The external DC power source may be located with the amplifier, soundboard or other audio equipment and the DC power supplied via the novel signal cable, plug and jack to the signal conditioner circuitry inside or otherwise on the musical instrument. Preferably, a novel plug on the end of the signal cable that is plugged into the connector or jack through the wall of the musical instrument is used to provide the electrical power to the signal conditioner circuitry. The novel plug has a housing that is grasped to insert the plug into or remove it from the instrument jack. Inside the housing is a small, replaceable battery. The battery is wired to the plug. The housing is removed whenever the battery is to be removed or replaced. When the plug is inserted into the connector or jack of the musical instrument, DC electrical power from the battery is supplied to the signal conditioner circuitry of the musical instrument.

BRIEF DESCRIPTION OF THE DRAWINGS

Reference is made to the accompanying drawings in which are shown illustrative embodiments of the invention, from which its novel features and advantages will be apparent, and wherein.

DESCRIPTION OF THE PREFERRED EMBODIMENTS

In the following detailed description of the invention reference is made to use with a musical instrument such as a guitar. However, it should be understood by those skilled in the art that the invention may be utilized in any application where: (a) a signal is generated within a piece of equipment that includes electrical circuitry, (b) the signal is conditioned by the electrical circuitry before exiting the piece of equipment, (c) it is inconvenient and/or difficult to access the interior of the equipment to replace a power source in the form of a battery that powers the electrical circuitry, and (d) the conditioned signal is output from the equipment via a jack or connector.

While a jack 18 and a mating plug 19 are mentioned in the following description, other types of connectors may be utilized. Preferably, the plug 19 is a standard ¼ inch stereo plug that plugs into a standard ¼ inch jack 18. In addition, only a three terminal plug and jack are described herein, but four terminal plugs and jacks may also be utilized.

Figure 1:
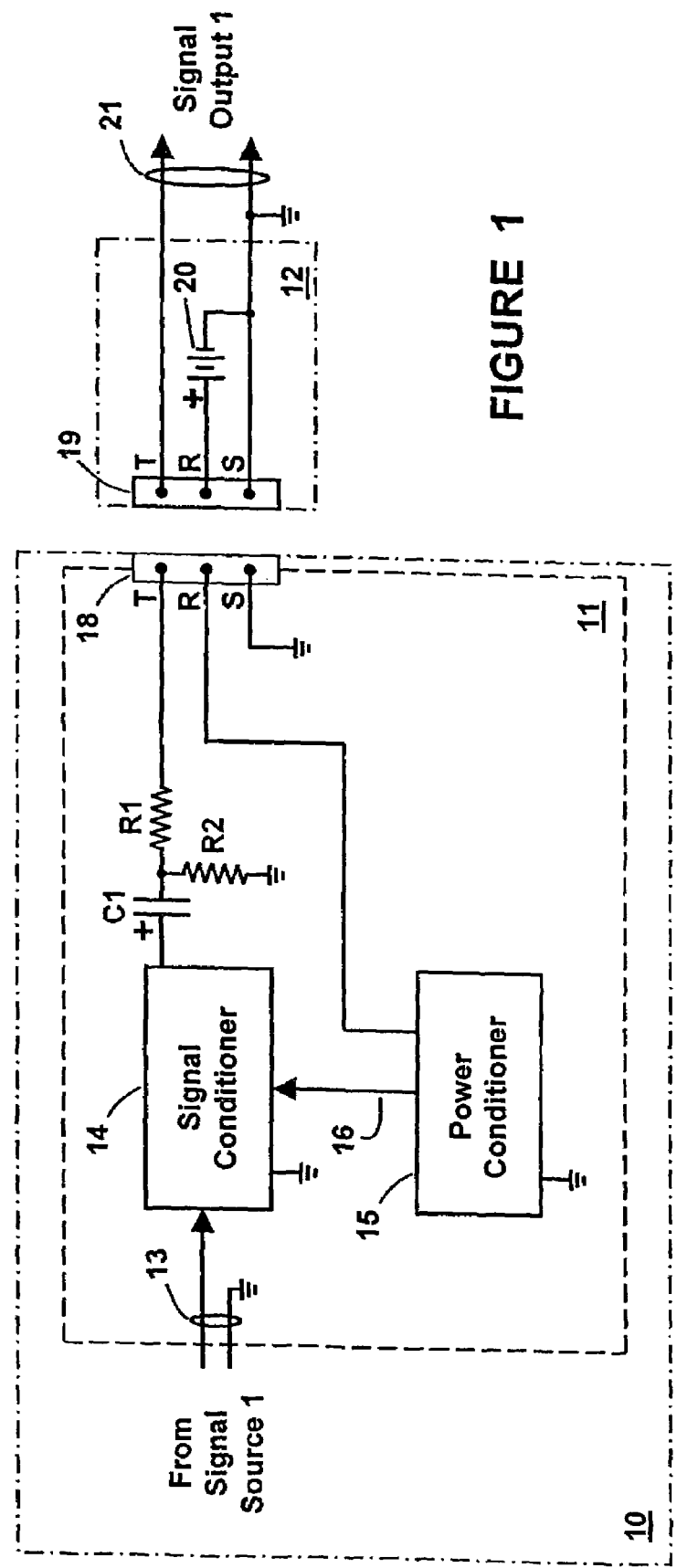
FIG. 1 is a block diagram schematic of a first embodiment of electronic circuitry mounted on a musical instrument that is powered by a power source that is external to the instrument.

In FIG. 1 is shown a block diagram schematic of a first embodiment of the invention wherein electronic circuitry including a signal conditioner 14 is located on a circuit board 11 on a musical instrument 10, but is powered by an electrical power source 20 that is external to the instrument. There is a jack 18 of the type described in the previous paragraph mounted on the musical instrument 10. There is also a plug 19 of the type described in the previous paragraph mounted on the end of a signal cable 21 that carries the conditioned signal to remote equipment such as an amplifier, soundboard or other audio equipment (not shown).

Briefly, the musical instrument 10 generates an electrical signal indicated as signal source 1 that is input to and processed by the signal conditioner 14 before being output from the instrument 10 via the jack 18. There is no source of electrical power mounted inside the instrument 10 for powering circuitry on the circuit board 11. The electronic circuitry mounted on the musical instrument 10 is powered solely by the electrical power source 20 that is external to the instrument 10. This eliminates the prior art problem of getting inside a musical instrument to remove or replace a battery.

The plug 19 with a housing 12 is mounted on one end of the signal cable 21. Plug 19, with the housing 12 attached thereto, is grasped to insert plug 19 into or to remove plug 19 from jack 18. Housing 12 is easily removable and inside the housing is a small, replaceable battery 20. Battery 20 is preferably a small coin type 1.5 volt or 3.0 volt battery readily available in drugstores and department stores. The battery 20 is wired to plug 19 as shown. Housing 12 is removed whenever battery 20 is to be removed or replaced. When plug 19 is inserted into jack 18, DC electrical power from battery 20 is supplied to signal conditioner 14 inside musical instrument 10 via power conditioner circuitry 15.

In more detail, battery 20 inside housing 12 is connected to plug 19 such that its first terminal is connected to the ring (R) contact of the plug, and its second terminal is connected to the sleeve (S) contact of the plug. The conditioned signal from musical instrument 10 exits the instrument via the tip (T) contact of plug 19 to be carried via cable 21 to a remote amplifier, soundboard or other audio equipment (not shown) to be used in a manner well known in the art.

When plug 19 is plugged into jack 18, battery 20 is thereby connected between the R contact and the S contact of jack 18. As seen in FIG. 1, this connects battery 20 to the power conditioner 15 on circuit board 11 inside instrument 10. Power conditioner 15 is any type of DC-DC converter used to convert the voltage of battery 20 to a higher voltage as may be needed by signal conditioner 14 to operate properly. The higher voltage is output from power conditioner 15 on a lead 16 to provide the necessary operating power to signal conditioner 14.

In the event that signal conditioner 14 can operate using the output voltage directly from battery 20 inside housing 12, power conditioner 15 may be eliminated and the R contact of plug 19 is connected directly to the power input of signal conditioner 14 on the lead 16.

The signal from musical instrument 10 on leads 13 is input to signal conditioner 14. Signal conditioner 14 may be as simple as a pre-amplifier, or it may perform other types of signal processing known in the art. The conditioned signal output from signal conditioner 14 passes through capacitor C1 and resistor R1 and is connected to the T contact of plug 19. The conditioned signal then passes to the T contact of plug 19 and on to signal cable 21.

Figure 2:
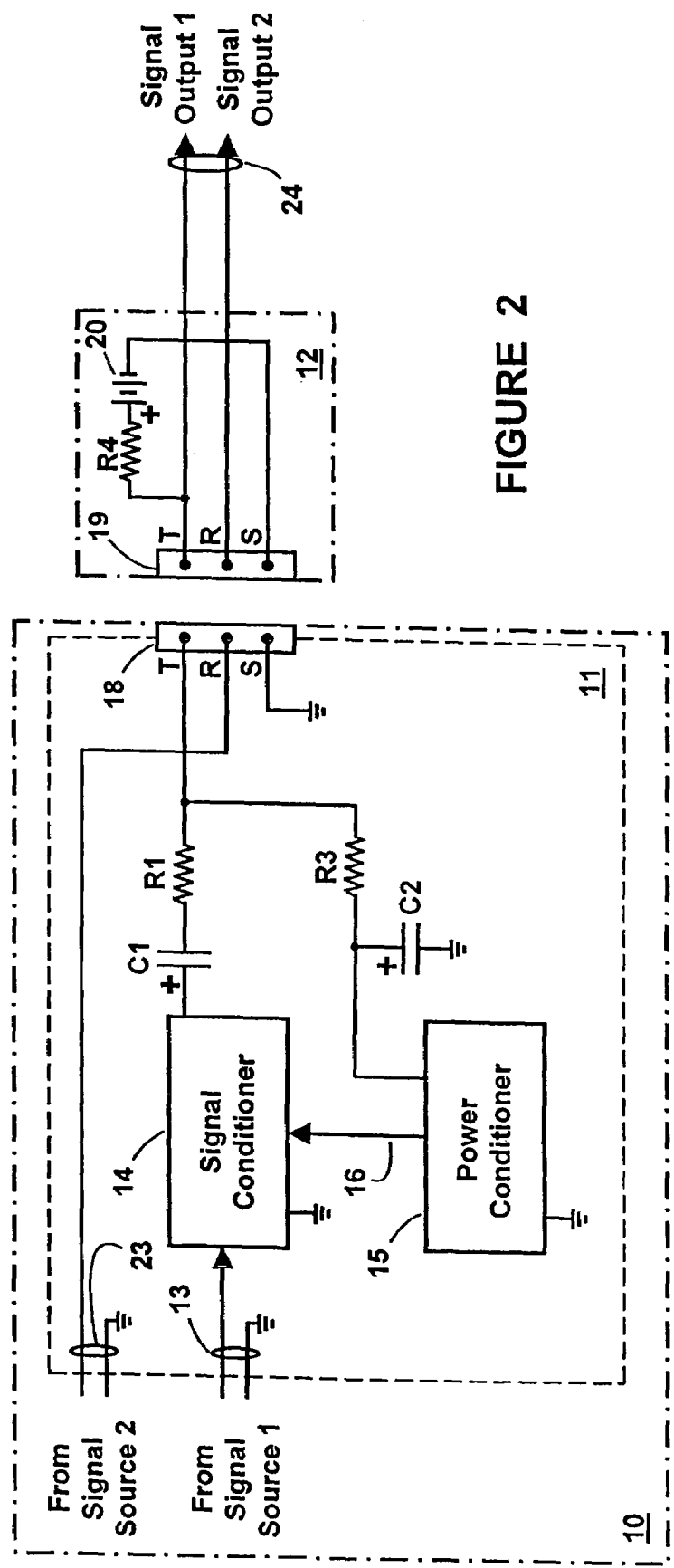
FIG. 2 is a block diagram schematic of a second embodiment of the electronic circuitry mounted on the musical instrument that is powered by a power source that is external to the instrument.

In FIG. 2 is shown a block diagram schematic of a second embodiment of the invention wherein electronic circuitry on circuit board 111 includes signal conditioner 14 and is located inside a musical instrument 10 but is powered from an electrical power source 20 external to the instrument. There are many similarities between the first and second embodiments of the invention, but there are some key differences. One similarity is that housing 12 with plug 19 contains a battery 20 that is easily accessed to remove or replace the battery. Another similarity is that power conditioner 15 is a DC-DC converter that is utilized if signal conditioner 14 needs a higher voltage to operate than is supplied by battery 20. Also, power conditioner 15, resistor R3 and capacitor C2 may be eliminated if signal conditioner 14 can operate using the voltage supplied by battery 20 inside housing 12.

The primary difference between the first embodiment of the invention shown in FIG. 1 and the second embodiment of the invention shown in FIG. 2 is that the latter can pass two signals from instrument 10. To do this, plug 19 and jack 18 are wired differently. Battery 20 is connected between the T contact and S contact of plug 19 with the positive contact of battery 20 being connected to the T contact. With this configuration, both the conditioned audio signal output from signal conditioner 14 and DC power from battery 20 are passed via the T contact of plug 19 and jack 18. Capacitor C1 is used to isolate the battery voltage on the T contact of jack 18 from the output of signal conditioner 14.

The circuitry on circuit board 11 and plug 19 inside instrument 10 can concurrently pass two separate signals on leads 13 and 23 from instrument 10 through plug 19 but only one of the two signals is conditioned by signal conditioner 14. The first signal on leads 13 from instrument 10 is processed by signal conditioner 14 and exits instrument 10 via the T contact of jack 18. Signal conditioner 14 may be as simple as a pre-amplifier or it may perform other types of signal processing known in the art.

The second signal on the leads 23 from instrument 10 are not processed in any manner and exit instrument 10 via the R contact of jack 18 and plug 19. Although not shown, a second signal conditioner could be added on circuit board 11 to condition the second signals on leads 23. The two separate signals on the leads of a signal cable 24 are input to a remote amplifier, soundboard or other audio equipment (not shown) to be used in a manner well known in the art.

Figure 3:
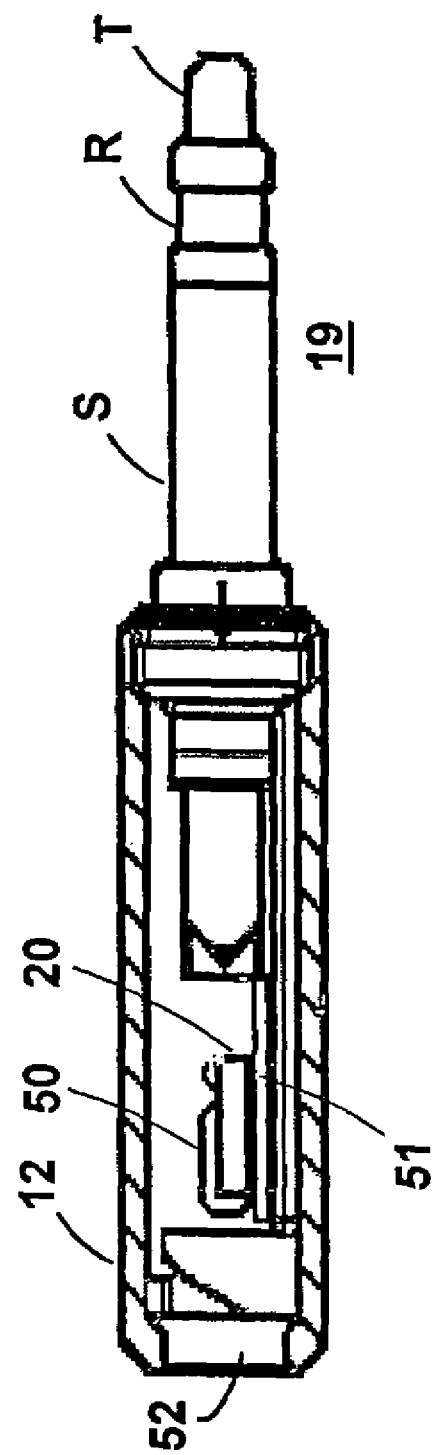
FIG. 3 is a side cutaway view of a ¼ inch jack showing a battery mounted therein.

In FIG. 3 is shown a side cutaway view of a ¼ inch jack with a battery mounted therein. Plug 19 has a tip (T) contact, a ring (R) contact and a sleeve (S) contact as previously described with reference to FIGS. 1 and 2. Housing 12 screws onto the rear of plug 19 in a manner well known in the art. As previously described, housing 12 is grasped to either insert plug 19 into or remove it from jack 18. At the rear of housing 12 is an opening 52 into which cable 21 (FIG. 1) or 24 (FIG. 2) is inserted to be fastened to the T, R, and S leads of plug 19 in a manner well known in the art. The novel aspect of plug 19 and housing 12 is that a small circuit board 51 is attached to the rear of plug 19, and on board 51 is battery 20, which is held in place by a battery holder 50. As previously described, battery 20 is preferably a small coin type 1.5 volt or 3.0 volt battery readily available in drugstores and department stores. When battery 20 is to be removed or replaced, housing 12 is unscrewed from the rear of plug 19 to access the battery. Housing 12 is then replaced.

Figure 4:
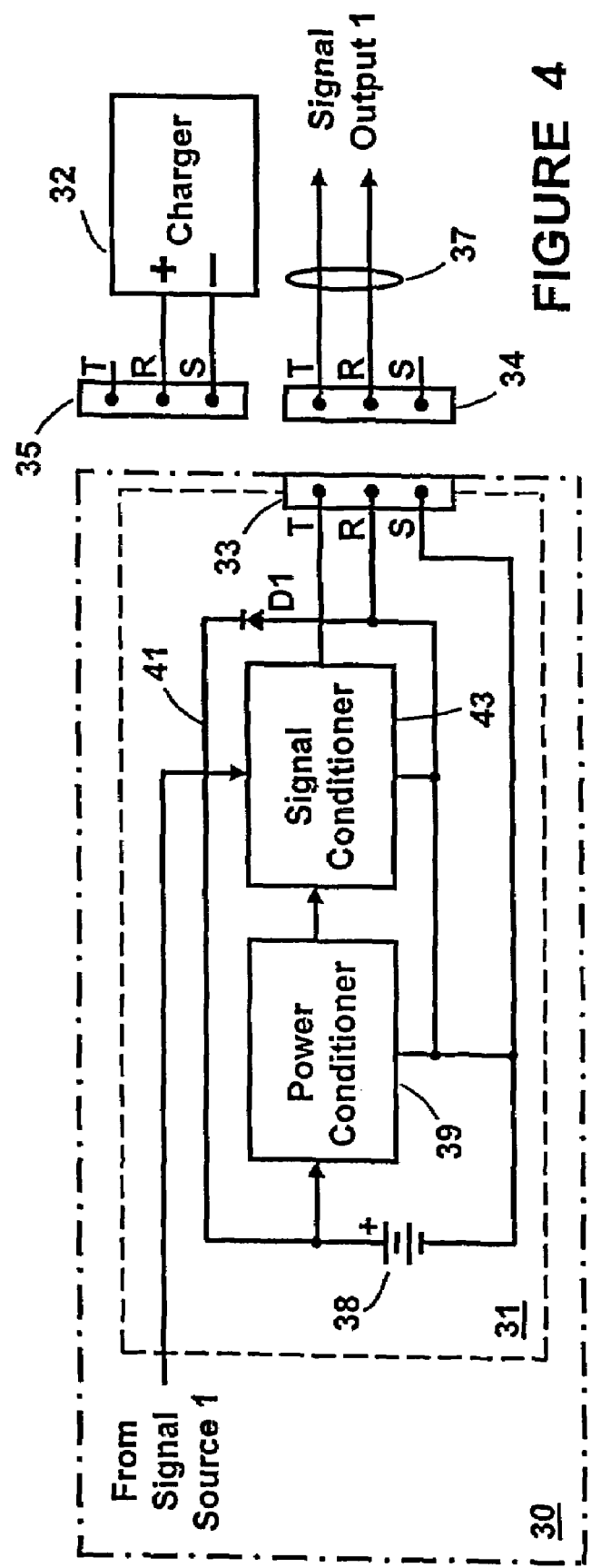
FIG. 4 is a block diagram schematic of a third embodiment of the electronic circuitry and a rechargeable power source located on the musical instrument, wherein the electronic circuitry is powered by the rechargeable power source that is charged by a power source external to the instrument.

In FIG. 4 is shown a block diagram schematic of a third embodiment of the invention where a power source 32 external to an instrument 30 is used to provide power to circuitry on circuit board 31 inside musical instrument 30. More particularly, the external power source 32 is used to charge an energy storage device 38, preferably in the form of a capacitor or a rechargeable battery, located on the musical instrument 30. The electronic circuitry on the board 31 is in turn powered by the charged rechargeable power source 38. Thus, the prior art need to frequently get inside instrument 30 to replace a non-rechargeable battery is eliminated.

With this configuration a main difference is that external power from charger 32 is not applied to instrument 30 while a plug 34 on the end of a signal cable 37 is plugged into a jack 33 to output the conditioned audio signal from musical instrument 30.

More particularly, to charge the rechargeable battery 38 inside instrument 30 a charger 32 with a plug 35 is utilized. Charger 32 may comprise batteries or be an AC-DC converter. The positive potential of charger 32 is connected to the R contact of the plug 35 and the negative potential is connected to the S contact. During charging mode, the signal cable 37 cannot be plugged into the jack 33, but plug 35 is plugged into jack 33. As shown in FIG. 4, when charger plug 35 is plugged into jack 33, the negative terminal of charger 32 is connected to the negative terminal of rechargeable battery 38 and the positive terminal of charger 32 is connected via diode a D1 and a lead 41 to the positive terminal of charger 32. The diode D1 is connected so that current can pass through it to charge battery 38. However, when charger 32 is unplugged from jack 33 and the plug 34 of signal cable 37 is plugged into jack 33 to output the audio signal from musical instrument 30, diode DI will prevent the discharge of battery 38 over this same path. Charged battery 38 is connected to provide power to a power conditioner 39.

The power conditioner 39 is any type of DC-DC converter used to convert the voltage of battery 38 to a higher voltage as may be needed by a signal conditioner 43 to operate properly. In the event that the signal conditioner 43 can operate using the voltage output directly from battery 38, power conditioner 39 may be eliminated and the positive terminal of battery 38 may be connected directly to the power input of signal conditioner 43.

The signal from musical instrument 30 is input to signal conditioner 43. Signal conditioner 43 may be as simple as a pre-amplifier or it may perform other types of signal processing known in the art. The conditioned signal output from signal conditioner 43 is connected to the T contact of jack 33. The conditioned signal then passes to the T contact of plug 34 and on to signal cable 37.

When battery 38 needs recharging plug 34 of signal cable 37 is unplugged from jack 33 and plug 35 of charger 32 is plugged into jack 33 for a sufficient time to recharge battery 38 in the manner described above.

Figure 5:
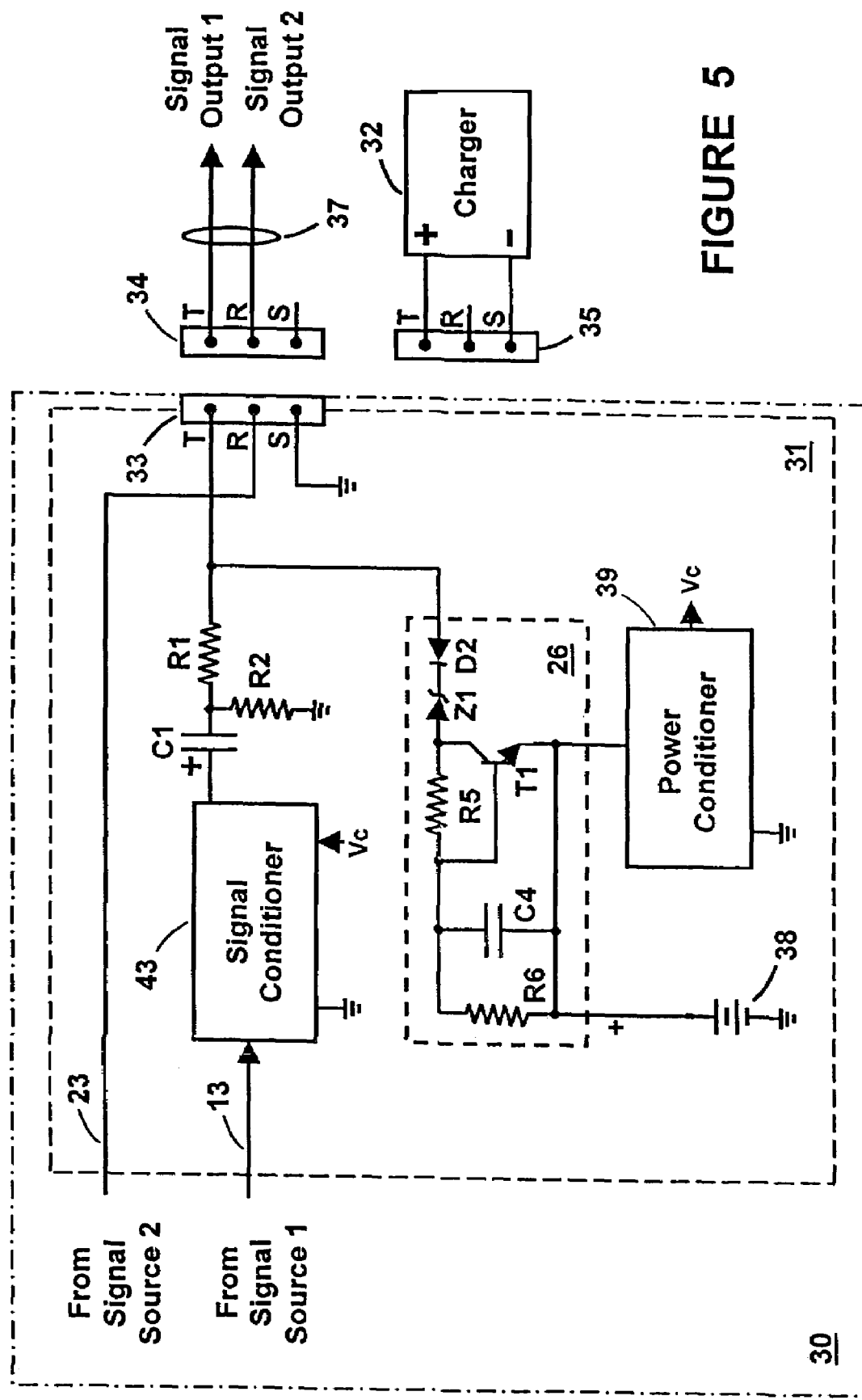
FIG. 5 is a block diagram schematic of a fourth embodiment of the electronic circuitry and the rechargeable power source located on the musical instrument, wherein the electronic circuitry is powered by the rechargeable power source that is charged by a power source external to the instrument.

In FIG. 5 is shown a block diagram schematic of a fourth embodiment of the invention where an electrical power source 32 external to instrument 30 is used to provide electrical power to circuitry on circuit board 31 inside musical instrument 30. More particularly, as previously described with reference to FIG. 4, external power source 32 is used to charge an electrical energy storage device 38 which is preferably a capacitor or a rechargeable battery 38 that is located on the musical instrument 30. The electronic circuitry on circuit board 31 is, in turn, powered by the rechargeable power source 38. Thus, the prior art need to frequently get inside the instrument to remove or replace the battery is eliminated.

There are many similarities between the third and fourth embodiments of the invention, but there are some key differences. One similarity is that both embodiments utilize a charger 32 with a plug 35. Another similarity is that power conditioner 39 is a DC-DC converter that is utilized if signal conditioner 43 needs a higher voltage to operate than is supplied by rechargeable battery 38. Also, power conditioner 39 may be eliminated if signal conditioner 43 can operate using the voltage supplied by battery 38 inside instrument 30.

Another similarity is that the external electrical power from charger 32 is not applied to musical instrument 30 while plug 34 on the end of Signal cable 37 is plugged into jack 33 to output the conditioned audio signal from musical instrument 30.

The primary difference between the third embodiment of the invention shown in FIG. 4 and the fourth embodiment shown in FIG. 5 is that the latter can concurrently pass two signals from instrument 30. To accomplish this, plugs 34 and 35 and jack 33 are wired differently. Charger 32 is connected between the T contact and S contact of plug 35 with the positive contact of charger 32 being connected to the T contact. The capacitor C1 is still used to isolate the voltage on the T contact of jack 33 of charger 32 from the output of signal conditioner 43 when charger plug 35 is plugged into jack 33.

When it is desired to recharge the rechargeable battery 38 inside instrument 30 the charger 32 with the plug 35 is utilized. During charging mode, plug 34 of signal cable 37 cannot be plugged into jack 33 because charger plug 35 is plugged into jack 33. As shown in FIG. 5, when plug 35 is plugged into jack 33, the negative terminal of charger 32 is connected to ground which is connected to the negative terminal of rechargeable battery 38, and the positive terminal of charger 32 is connected via the electronic switch 26 to the positive terminal of battery 38. Charged battery 38 is connected to provide power to power conditioner 39 which, in turn, provides converted power marked as $V_c$ to signal conditioner 43.

Power conditioner 39 is any type of DC-DC converter used to convert the voltage of battery 38 to a higher voltage as may be needed by signal conditioner 43 to operate properly. In the event that signal conditioner 43 can operate using the voltage output directly from battery 38, power conditioner 39 may be eliminated and the positive terminal of battery 38 connected to an electronic switch 26 which, in turn, is connected to the T contact of plug 35 and jack 33 would be connected directly to the positive terminal of battery 38.

Electronic switch 26 serves the following purposes. It prevents battery 38 from discharging through resistors R1 and R2 at the output of signal conditioner 43. It also prevents loading down of the conditioned signal output from signal conditioner 43 by battery 38. When plug 35 of charger 32 is plugged into jack 33 the output voltage of charger 32 is greater than the sum of the voltage drops across a diode D2, a zener diode Z1, $V_{be}$ of a transistor T1 and the voltage of battery 38. Thus, the transistor T1 is turned on and charging current flows into battery 38. When charger 32 plug 35 is unplugged from jack 33, and plug 34 of signal cable 37 is plugged into jack 33, transistor T1 in electronic switch 26, is not conducting and the positive terminal of internal rechargeable energy source 38 is not connected to the T contact of jack 33 and the conditioned signal now present from signal conditioner 43.

The first audio signal on lead 13 from musical instrument 30 is input to signal conditioner 43. Signal conditioner 43 may be as simple as a pre-amplifier or it may perform other types of signal processing known in the art. The conditioned first signal output from signal conditioner 43 is connected to the T contact of jack 33 via capacitor C1 and the resistor R1. The conditioned signal then passes to the T contact of plug 34 and on to signal cable 37 for use at a remote location as previously described.

The second signal from instrument 30 on lead 23 is not conditioned in any manner and exits instrument 10 via the R contact of jack 33. Although not shown, a second signal conditioner could be added to circuitry of board 31 to process the second signal on lead 23. The two separate signals on leads 37 are input to a remote amplifier, soundboard or other audio equipment (not shown) to be used in a manner well known in the art.

While what has been described herein are four embodiments of the invention, it will be obvious to those skilled in the art that numerous changes may be made without departing from the spirit and scope of the invention. For example, four contact plugs and jacks may be used in lieu of the three contact plugs and jacks described herein. Also, the unconditioned second signals in FIGS. 2 and 5 may be conditioned by adding an additional signal conditioner. Further, in the drawings, the aforesaid first terminal is depicted as positive and the second terminal is depicted as negative; however, it will be apparent that the first terminal could be negative and the second terminal could be positive and the respective circuits modified accordingly, to obtain the same result.

What is claimed is:

1. Apparatus for providing electrical power to a musical instrument, wherein the instrument generates a signal, has signal conditioning circuitry internal to the instrument for conditioning the signal and requiring the electrical power to operate, has a signal connector mounted on the instrument, with the connector being used to remove the conditioned signal from the instrument for further use, and wherein there is no electrical power source internal to the instrument to provide electrical power to the signal conditioning circuitry, the apparatus comprising:

a plug that is inserted into the signal connector to remove the conditioned signal from the instrument for further use; and an electrical power source located external to the musical instrument, the electrical power source being electrically connected to said plug, and electrical power from said electrical power source is transferred from said plug to the connector when said plug is inserted into the connector, and wherein the signal conditioning circuitry is connected to and receives the electrical power it needs to operate from the connector.

2. The apparatus in accordance with claim 1 and further comprising:

a housing physically attached to said plug, and said housing is held to insert said plug into and to remove said plug from engagement with the signal connector;

an electrical power source located inside said housing, said electrical power source being electrically connected to said plug, and electrical power from said electrical power source is transferred from said plug to the connector when said plug is inserted into the connector, and wherein the signal conditioning circuitry is connected to and receives the electrical power to operate via the connector.

3. The apparatus in accordance with claim 2 wherein said electrical power source comprises a battery that is mounted inside said housing, and wherein said housing is easily removed to insert or remove said battery.

4. The apparatus in accordance with claim 3 wherein the connector has a plurality of contacts and said plug has a plurality of contacts, the contacts of said plug and connector mate together when said plug is inserted into the connector, and further comprising a signal carrying wire that is connected to a contact in said plug associated with a first associated set of the mating contacts to receive and carry the conditioned signal to a remote location for the further use, and the electrical power from said electrical power source inside said housing is carried to the signal conditioning circuitry via the first associated set of mating contacts.

5. The apparatus in accordance with claim 1 wherein the connector has a plurality of contacts and said plug has a plurality of contacts, the contacts of said plug and connector mate together when said plug is inserted into the connector, and further comprising a signal carrying wire that is connected to a contact in said plug associated with a first set of the mating contacts to receive and carry the conditioned signal to a remote location for the further use, and the electrical power from said electrical power source to the signal conditioning circuitry is also transferred from said plug to the connector and thence to the signal conditioning circuitry via the first set of mating contacts.

6. The apparatus in accordance with claim 1 wherein said electrical power source comprises a battery that is mounted with said plug.

7. The apparatus in accordance with claim 6 wherein a second signal is generated by the instrument, wherein the connector has a plurality of contacts and said plug has a plurality of contacts and the contacts of said plug and connector mate together when said plug is inserted into the connector, the conditioned signal from the signal conditioning circuitry is transferred from the connector to said plug via a first set of mating contacts and thence to a remote location for the further use, and the second signal is transferred from the connector to said plug via a second set of mating contacts and thence to a remote location for the further use.

8. Apparatus for providing electrical power to a musical instrument, wherein the instrument generates a signal, has signal conditioning circuitry internal to the instrument for conditioning the signal and requiring the electrical power in order to operate, has a signal connector mounted on the instrument, with the connector being connected to the signal conditioning circuitry and being used to remove the conditioned signal from the instrument for further use, the apparatus comprising:
- a rechargeable energy source mountable on the musical instrument for storing electrical power to operate the signal conditioning circuitry;
- an electrical power source located external to the musical instrument; and
- a first plug, said electrical power source being connected to said first plug, and electrical power from said electrical power source is transferred from said first plug to the connector when said first plug is inserted into the connector, and wherein said rechargeable energy source is connected to and receives the electrical power via the connector to be charged.

9. The apparatus in accordance with claim 8 further comprising a second plug, said second plug being inserted into the signal connector to remove the conditioned signal from the instrument for further use.

10. The apparatus in accordance with claim 9 wherein only either said first or said second plug can be plugged into the connector at a time.

11. The apparatus in accordance with claim 10 further comprising an electronic switch inside the musical instrument that senses when said first plug with said electrical power source connected thereto is plugged into the connector, to connect said electrical power source to charge said rechargeable energy source inside the musical instrument.

12. The apparatus in accordance with claim 11 further comprising a signal carrying wire that is connected to a contact in said second plug to receive and carry the conditioned signal to a remote location for the further use.

13. The apparatus in accordance with claim 8 further comprising an electronic switch inside the musical instrument that senses when said first plug with said electrical power source connected thereto is plugged into the connector, to connect said electrical power source to charge said rechargeable energy source inside the musical instrument.

14. The apparatus in accordance with claim 13 further comprising a second plug, said second plug being inserted into the signal connector to remove the conditioned signal from the instrument for further use.

15. The apparatus in accordance with claim 14 wherein only either said first or said second plug can be plugged into the connector at a time.

16. The apparatus in accordance with claim 15 wherein a second signal is generated by the instrument, wherein the connector has a plurality of contacts and said plug has a plurality of contacts and the contacts of said plug and connector mate together when said plug is inserted into the connector, the conditioned signal from the signal conditioning circuitry is transferred from the connector to said second plug via a first set of mating contacts and thence to a remote location for the further use, and the second signal is transferred from the connector to said second plug via a second set of mating contacts and thence to a remote location for the further use.

17. The apparatus in accordance with claim 9 further comprising a signal carrying wire that is connected to a contact in said second plug to receive and carry the conditioned signal to a remote location for the further use.

18. Apparatus for providing electrical power to a musical instrument, wherein the instrument generates a signal, has signal conditioning circuitry internal to the instrument for conditioning the signal and requiring the electrical power to operate, has a signal connector in communication with the signal conditioning circuitry mounted in the instrument, with the connector being used to remove the conditioned signal from the instrument for further use, and wherein there is no electrical power source internal to the instrument to provide electrical power to the signal conditioning circuitry, the apparatus comprising:
- a plug that is inserted into the signal connector to remove the conditioned signal from the instrument for further use;
- a housing physically attached to said plug, and said housing is held to insert said plug into and to remove said plug from engagement with the signal connector;
- an electrical power source located inside said housing, said electrical power source being electrically connected to said plug, and electrical power from said electrical power source is transferred from said plug to the connector when said plug is inserted into the connector, and wherein the signal conditioning circuitry is connected to and receives the electrical power to operate via the connector.

19. The apparatus in accordance with claim 18 wherein said electrical power source comprises a battery that is mounted inside said housing.

20. The apparatus in accordance with claim 19 wherein said housing comprises means that can be opened and closed to insert or remove said battery.

* * * * *